United States Patent [19]

Thompson

[11] Patent Number: 4,481,505
[45] Date of Patent: Nov. 6, 1984

[54] ILLUMINATED MAST-TOP WIND INDICATOR

[76] Inventor: David M. Thompson, 803 Mantoloking Rd., Brick Town, N.J. 08723

[21] Appl. No.: 341,278

[22] Filed: Jan. 21, 1982

[51] Int. Cl.³ .................... G08W 1/00; G08W 1/02
[52] U.S. Cl. .................... 340/601; 73/188; 114/144 C; 340/949; 340/984
[58] Field of Search .................. 340/601, 26, 25, 949, 340/984, 985; 116/265; 73/188, 189, 170 R; 114/144 C

[56] References Cited

U.S. PATENT DOCUMENTS

| | | | |
|---|---|---|---|
| 1,342,860 | 6/1920 | Mortimer et al. | 73/189 |
| 1,359,406 | 11/1920 | McCarty | 73/188 |
| 1,644,547 | 10/1927 | Smith | 73/189 |
| 1,879,267 | 9/1932 | Hurni | 340/26 |
| 2,404,933 | 7/1946 | Stockstrom | 340/26 |
| 3,049,008 | 8/1962 | Polster | 73/188 |
| 3,537,310 | 11/1970 | Barrett | 73/188 |
| 3,691,829 | 9/1972 | Perry | 73/189 |

Primary Examiner—James L. Rowland
Assistant Examiner—Daniel Myer
Attorney, Agent, or Firm—Charles F. Gunderson

[57] ABSTRACT

An apparent-wind direction indicator for day and night sailing has a hollow conical section with an axial counterbalancing rod extending forward from the apex of the cone. The wind direction indicator is mounted to pivot about a hollow tube extending above the top of a mast. The top of the hollow tube extends within the conical section. An electric lamp is mounted at the top of the hollow tube within the hollow conical section and is illuminated by means of wires through the tube connecting to the ship's power supply. A substantial portion of the underbody of the hollow conical section is made of light-transmitting material so that the light from the electric lamp will be visible from the deck below. The light-transmitting material, as well as the conical section is formed to suggest an arrow to indicate the direction of the wind to the deck below.

4 Claims, 4 Drawing Figures

ILLUMINATED MAST-TOP WIND INDICATOR

BACKGROUND OF THE INVENTION

Wind vanes of one kind or another have been known for too long to recount. They range from banners or flags to tell-tale ribbons that follow the direction of the wind. Airports use wind socks that are more steady and more visable from a distance. More sophisticated mechanisms employ a vertical flat surface of some kind—sometimes with a moveable device driven by the wind—behind the pivot point. These are all fine in the daytime, but are of little value at night, unless they are lit by a flood light from below.

The problems of wind vanes on sailing craft is more demanding. It is desireable, if not essential, to have the apparent wind indicated in a steady, accurate manner at all times and under all points of sailing. Here the common pennants or tell-tales maybe satisfactory for daytime sailing, but are of little or no value at night. A mast-head fly, or wind direction indicator, even though it should be more stable, accurate, and effective, is, similarly, of little values at night.

It is therefore an object of this invention to provide a solid, well-bearinged, easily-visible, mast-head fly for sailboats. It is a further object of this invention to provide a mast-head fly, or wind indicator, that has a translucent surface that is illuminated from the inside to be visible from the deck at night or under conditions of poor visibility. It is a further object of this invention to provide an illuminateable mast-head wind indicator that has an easily-identifiable form to quickly and accurately indicate the direction of the apparent wind at night.

SUMMARY OF THE INVENTION

A mast-head wind indicator for night sailing has an elongated, hollow body, tapered in the direction of the wind to suggest an arrow. It is pivoted about bearings around a hollow tube, extending into the forward section of the hollow body, at the top of the mast. A weighted rod extends forward of the pointed end of the tappered hollow body to balance the device about the pivot point. An electric lamp is mounted above the hollow tube, within the hollow tapered body, and the lower portion of the hollow tapered body includes transparent, or translucent, portions, particularly on the underside, that are illuminated by the lamp, when it is lighted, to indicate the direction of the apparent wind to an observer on the deck below.

BRIEF DESCRIPTIONS OF THE DRAWINGS

DETAILED DESCRIPTION OF THE DRAWINGS

Figure 1:
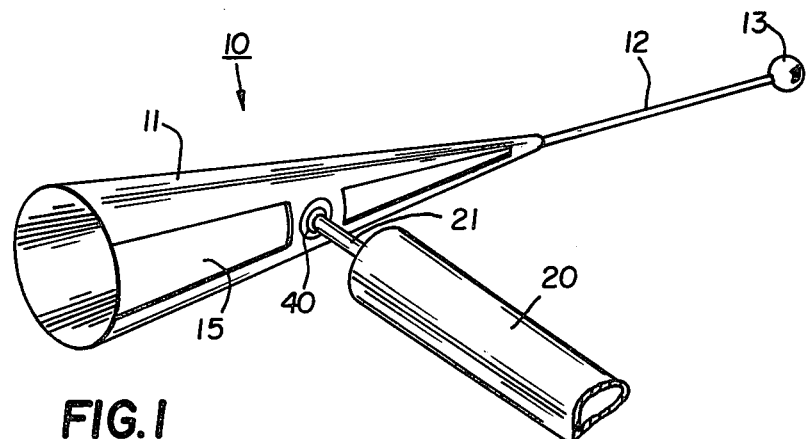
FIG. 1 is an isometric view of the device mounted on a mast head.

Referring now more particularly to FIG. 1, an isometric view of a typical device 10 is shown on a mast head 20, mounted on a supporting tube 21. The wind indicator or mast-head fly has a hollow body 11 tapering towards a forward rod or shaft 12 terminating in a balancing weight 13. The hollow body 11 may have panels such as 15 that are translucent or transparent to permit light, from the inside of the hollow body to shine down to indicate the direction of the wind to anyone on the deck. The device is pivoted on bearings such as 40 that will be more clearly seen in the other figures.

Figure 2:
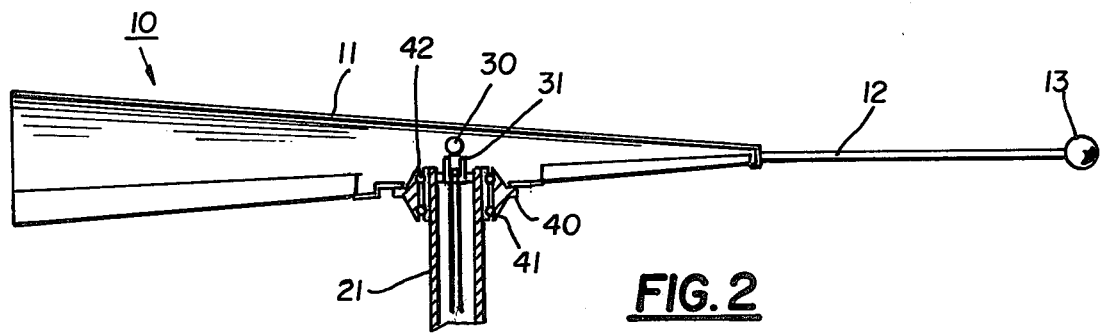
FIG. 2 is a cross-sectional side view of the device.

FIG. 2 shows a cross section of the same species as seen in FIG. 1, with similar elements similarly numbered. This shows, more clearly, the supporting tube 21 holding a bearing assembly 40 with races of ball bearings 41 and 42 to provide an easy motion for the device. This figure also shows a light bulb 30 in a socket 31 to provide the essential illumination of the wind indicator to be seen on the deck below at night.

Figure 3:
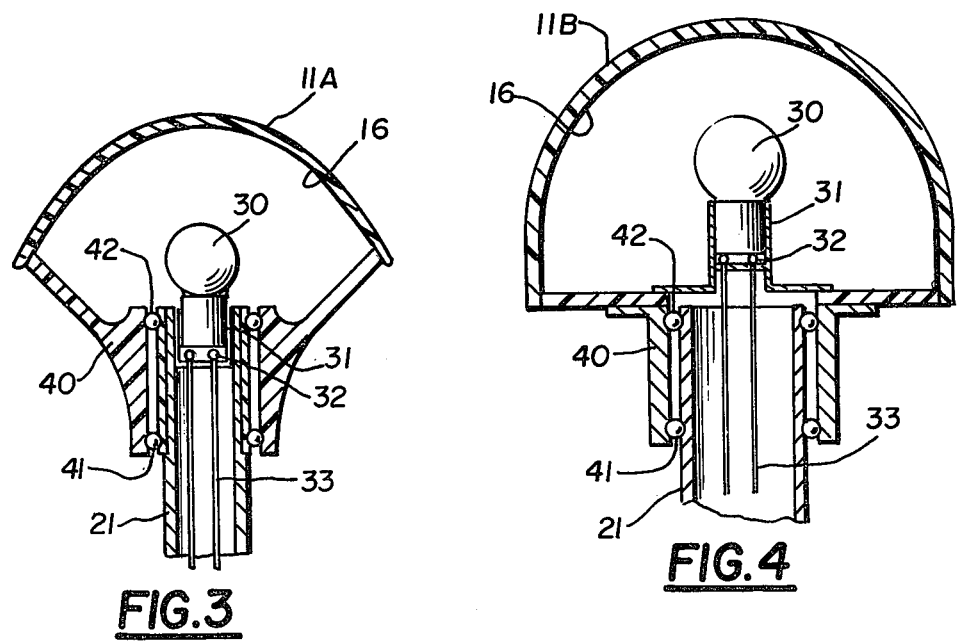
FIGS. 3 and 4 are cross-sectional end views of two species of this device.

FIG. 3 shows a cross section of another species of this device, looking along the axis of the device, with similar elements similarly numbered. This illustrates a different type of body 11A and variations in the mounting 40. The bearing races 41 and 42 are the same. The bulb 30, again, is mounted in its socket 31 and has contacts 32 and conductors 33 connecting the lamp to a power supply within the boat. This species includes a reflective surface 16 on the under side of the upper arc of the body. This would concentrate more of the available light in a downward direction to be more visible below, and thereby increase the effeciency of the overall device.

Figure 4:
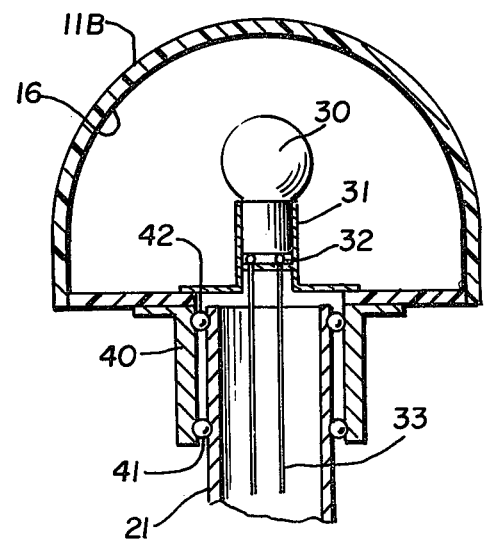

FIG. 4 shows still another variation of this device in cross section along the axis, through the pivot, with similar elements similarly numbered. Here the upper body is curved, and this species, again, has a reflective surface 16 to concentrate the available light from the bulb 30 in a downwardly direction. The underside of the body in this species is shown flat and should be of translucent or transparent plastic to indicate the direction of the wind, at night, to anyone on the deck below.

There are many possible variations of the size and shape of this wind indicator, but the general concept is one of a tapered body with a pointed and to head into the wind while the other end is enlarged to draw itself away from the wind. A rod 12, extending into the wind, with a weight 13 for balance, may or may not be necessary, but will permit the pivot point to be closer to the pointed end of the body, and contribute to the accuracy of the wind indication.

The pivot point must be near the pointed end of the wind indicator to let the larger end drag and follow the wind currents. This will, presumeably, make for a heavier tail section which should be counterbalanced as is done by 12 and 13. However, the pointed end could, itself, be weighted and the walls of the larger end could be narrower to provide balance within the conical section itself, even with a forward pivot mounting.

The conical section may be of any suitable material and would probably be of plastic for simple molding, for mass production, and to provide the basic translucency or transparency needed for the light to be visible from below. However, it could be of any opaque material, metal or plastic, with openings in the lower part for translucent panels.

The conical section, pivoted well forward, not only invariably follows the direction of the wind, but, with its pointed front and larger rear portion, also suggests an arrow head that could not possibly be misunderstood in its direction of point. This will be inherent if the entire body is translucent, and if separate panels are added to the lower portion, they should also be formd to suggest an arrow head. The front is sealed at its point, and the rear portion should also be sealed and presumeably opaque.

Most weathervanes are viewed from an oblique angle toward a rooftop or other high mounting point to be in unobstructed air. Airport wind socks, on the other hand, are, for the most part, viewed from above. This mast-top wind indicator, however, will be viewed from below, day and night, almost exclusively. This would favor the variations with the opaque sides and top. Light in these directions would appear to be wasted as far as the vessel is concerned.

This also suggests the use of the reflective surfaces 16 of FIGS. 3 and 4. These surfaces, which could also be applied to the species of FIGS. 1 and 2, or a simple plastic cone, would further concentrate the light from the lamp downwardly to increase the efficiency and reduce the amount of light and power needed for effective illumination.

A parabolic reflector section would, obviously, be most effective and effecient. This, combined with a transparent panel, could direct the light only directly downward. Reflectors could also be shaped to direct the light from the bulb toward the extremities of the cone, fore and aft, to provide more even illumination.

The illumination can also be controlled by varying the density of the panel or panels along the length of the conical section. The color, also, is a matter of choice, within regulations, and the entire wind indicator may be varied in color as well as in density along the length of the device for esthetic reasons or to accentuate the direction of the apparent wind.

There may, however, be regulations in existence, or to be added, that may restrict the type, direction, or color of the lights carried by a boat. This can be easily handled by the species of FIG. 3, and certainly FIG. 4, with reflectors already blocking the light from the sides and top. These species could also include downwardly-extending projections or curtains, not shown, from the sides of the curving upper sections that would make the illuminated panels visible only from directly below the wind indicator. However, the reflectors, and particularly the parabolic ones, with transparent panels, might focus sharply enough to not even need this.

The hollow conical section must, of course, be removeable from the hollow supporting shaft for the replacement of the light bulb when necessary. In this regard it may be noted that the light bulb may have two filaments—as do many car lamps of a standard car and boat voltage—for additional control of light, or merely as a safety factor. The switching mechanism for the bulb could, in any case, include a voltage control to adjust the amount of light to the level needed under varying situations.

Alternatively, two or more bulbs may be mounted on top of the hollow support with single or multiple conductors for additional or auxiliary light control.

Any conventional bearings would be applicable here. They must, of course, be weather-resistant, and should be able to function smoothly and effeciently, without maintenance, over a long period of time. The bearings should be sealed as effectively as possible, to keep out moisture, without impeding the rotation of the wind indicator.

It is to be understood that I do not desire to be limited to the exact details of construction shown and described since obvious modifications will occur to a person skilled in the art.

I claim:

1. A mast-top wind indicator comprising a hollow conical section having an upper parabolic cross section; a hollow tubular shaft extending through the lower portion, near the middle of said hollow conical section, perpendicular to the axis of said conical section; pivotable means supporting said conical section on said tubular shaft; a balancing rod attached to, and extending axially away from, the narrow end of said hollow conical section; at least one light bulb mounted on the top of said hollow tubular shaft within said hollow conical section at the focal point of said parabolic cross section; a source of electricity; means, extending through said hollow tubular shaft, for connecting said source of electricity to said light bulb; light transmitting panels forming a substantial portion of said lower portion of said hollow conical section; and reflecting material coating the inside of said upper, parabolic cross section to concentrate the light from said light bulb through said light-transmitting panels, downward along the axis of said tubular shaft to be visible from the deck below.

2. A mast-top wind indicator as in claim 1 wherein said rod extending axially away from said narrow end of said hollow conical section is weighted to balance the mass of the wide end of said conical section about said pivotable means supporting said conical section.

3. A mast-top wind indecator as in claim 1 wherein said conical section and said light-transmitting panels have an arrow-shaped configuration to clearly indicate the direction of the apparent wind.

4. A mast-top wind indicator as in claim 1 wherein said wide end of said hollow conical section is sealed to protect the interior of said section.

* * * * *